United States Patent [19]

Shogren

[11] 4,367,034

[45] Jan. 4, 1983

[54] SCANNING SYSTEM FOR COPIER

[75] Inventor: David K. Shogren, Ontario, N.Y.

[73] Assignee: Xerox Corporation, Stamford, Conn.

[21] Appl. No.: 269,522

[22] Filed: Jun. 1, 1981

[51] Int. Cl.³ ............................................. G03G 15/28
[52] U.S. Cl. .......................................... 355/8; 355/11; 355/66
[58] Field of Search ..................... 355/8, 11, 60, 57, 66

[56] References Cited

U.S. PATENT DOCUMENTS

| | | | |
|---|---|---|---|
| 3,454,335 | 7/1969 | Caldwell et al. | 355/8 |
| 3,650,621 | 3/1972 | Lewis et al. | 355/8 |
| 3,901,585 | 8/1975 | Bennett et al. | 350/184 |
| 4,056,308 | 11/1977 | McCrobie | 350/184 |
| 4,076,388 | 2/1978 | Bennett et al. | 350/187 |
| 4,232,960 | 11/1980 | Glab | 355/8 |

Primary Examiner—Richard L. Moses

[57] ABSTRACT

An optical system for a copying device is disclosed which scans a document lying in an object plane by means of a pivoting mirror and projects an image of the document onto the surface of a photoreceptor drum. By rotating the projection lens while simultaneously moving an aperture slit in a direction of movement opposite to the movement of the drum, a condition is constantly maintained wherein the object plane, lens plane and image plane are maintained parallel thereby eliminating field tilt. With this configuration, the image is also precessed onto the drum providing a precession distance which can be used to relax constraints normally imposed by scan return conditions.

4 Claims, 4 Drawing Figures

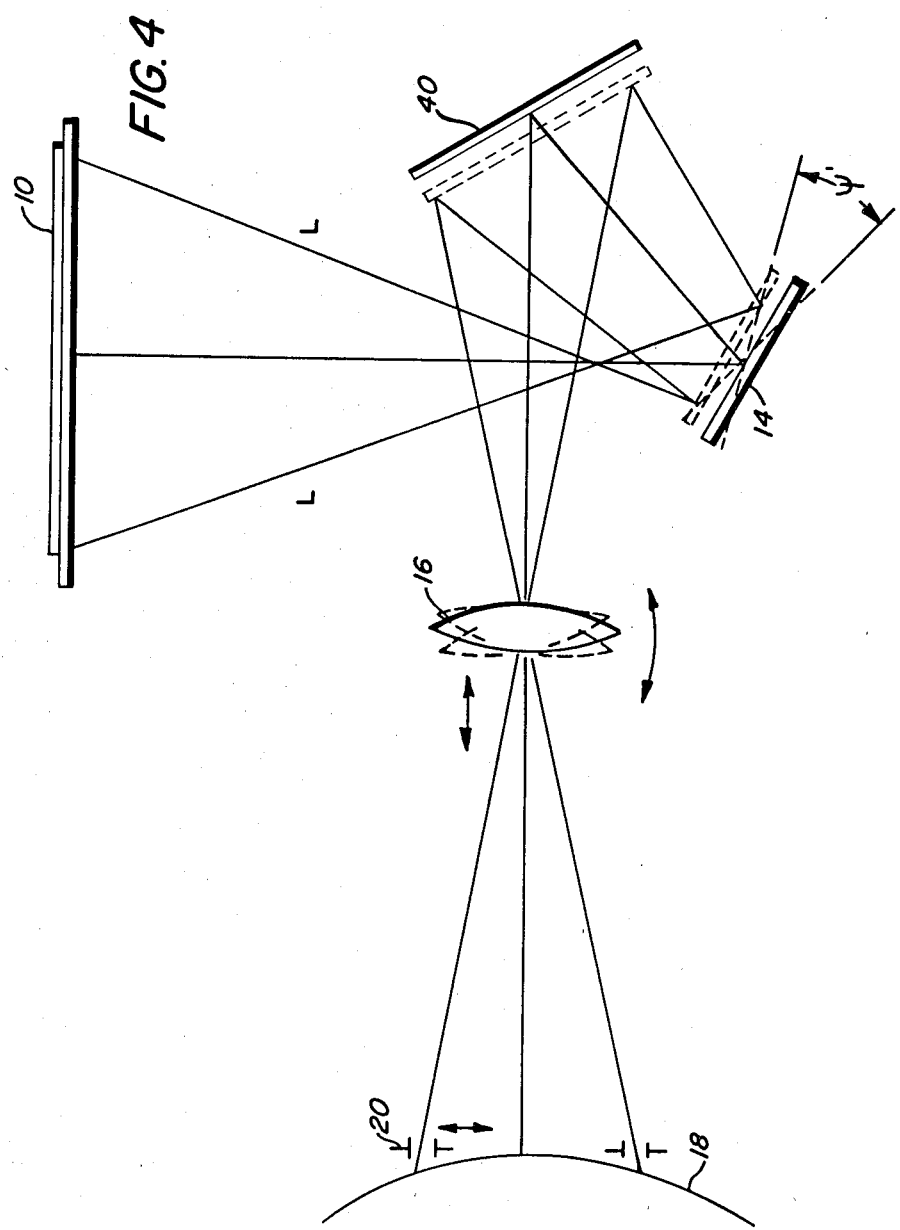

SCANNING SYSTEM FOR COPIER

BACKGROUND AND PRIOR ART STATEMENT

This invention relates generally to a xerographic copying device and, more particularly to an optical system which scans a document lying on an object plane by means of a pivoting mirror and projects the reflected document image onto a curved photosensitive surface.

Copying devices which utilize a fixed light source and pivoting mirror to scan a document on a curved platen are known in the art, e.g. the Xerox 2400 and 3600 machines. It is desirable to copy documents by placing them on a flat platen while retaining the scanning simplicity of a pivoting mirror arrangement. However, this has heretofore not been possible due to the basic problem of compensating for the "field tilt". Field tilt is the deviation of the image plane from parallelism to the ideal photoreceptor plane during scan. With use of a flat platen, a keystoning distortion effect also occurs because points on the image plane will vary in focus because of nonuniform magnification ratio or change in the ratio of the object and image conjugate distances during scan.

In one aspect of the present invention, there is provided an optical system which scans a document on a flat platen by means of a pivoting mirror and projects an image of said document onto a curved photoreceptor surface, the imaging being accomplished without the attendant problems of field tilt or keystoning distortion.

According to another feature of the invention, the scanned image is projected onto a moving photoreceptor at a rate faster than the rate of movement of the photoreceptor and in the direction opposite such movement. This technique, which can be termed as precessing the image, is generally known in the art. U.S. Pat. No. 3,454,335 (Caldwell) assigned to the same assignee as the present invention, discloses a method of projecting images on microfilm cards which are moved past a stationary lens and mirror system onto a drum photoreceptor. The drum and microfilm are moved at the same speed but the image is precessed (i.e. moved in a direction opposite the drum motion) onto the drum surface by means of a slit aperture. This combined slit and drum rotation exposes the drum at a speed (rate) that is greater than the surface speed of the drum. This scanning system demonstrates two of the advantages gained by image precession: the process speed of the system can be set at a lower speed for equivalent copy rate (copies per minute) and the gap ordinarily present between images (due to the return time of the scan optics) can be reduced or eliminated if desired. Scan return velocities for a given copy rate can also be minimized for a given copy rate, thus reducing scan accelerations, forces and vibrations. A problem with such a system, however, is that defocusing errors may result in developed images unacceptable for some systems. The errors are introduced because the image reflected from the drum mirror to the slit does not maintain perpendicularity to a tangential line at the drum surface.

This defocusing problem is addressed in U.S. Pat. No. 4,232,960 (Glab) assigned to the same assignee as the present invention. Glab solves the problem of field tilt in his particular scan system, by using linear and rotational motions of optical elements located near the drum surface to scan the image onto the drum at the angle corresponding to the angle of reflection of the image from the platen.

Another prior art device which utilizes precession onto a drum photoreceptor is disclosed in U.S. Pat. No. 3,650,621 (Lewis) also assigned to the same assignee as the present invention. Lewis discloses a system wherein an imaging device is moved in an arcuate path which is in a direction opposite to drum rotation to scan document on a curved platen onto the drum.

Another optical system for precessing an image onto a drum type photoreceptor is disclosed in copending U.S. Application Ser. No. 190,110 filed on Sept. 24, 1980 and assigned to the same assignee as the present application. In this copending application a dual rate scanning mirror is driven at a speed greater then the process speed of the drum photoreceptor. A drum reflector is adapted to reflect the image onto the drum surface in a direction opposite the drum rotation.

The present invention therefore is further directed to a scanning system which scans a document on a flat platen with a pivoting mirror arrangement while simultaneously precessing an image onto a curved photoreceptor without attendant defocusing problems. The invention is realized in a system which includes a projection lens having an object plane for supporting an object to be copied; a projection lens having a rotational and translational motion; a pivoting mirror for scanning said object and reflecting said light image towards said projection lens; an aperture slit located adjacent the curvilinear surface, the aperture slit moving in a direction opposite the direction of movement of the curvilinear surface; means for maintaining constant conjugate during scan; and means for synchronizing the motions of said lens, mirror and aperture slit so as to maintain parallel object, lens and image planes during the entire scan cycle; whereby said lens rotates simultaneously with said reflector and slit motion to continually maintain said projected image at the photosensitive surface at the same angle of incidence as the angle of the principal scanning ray at the object plane.

DRAWINGS

FIG. 4 is an embodiment of the scanning system of the present invention.

DESCRIPTION

Figure 1:
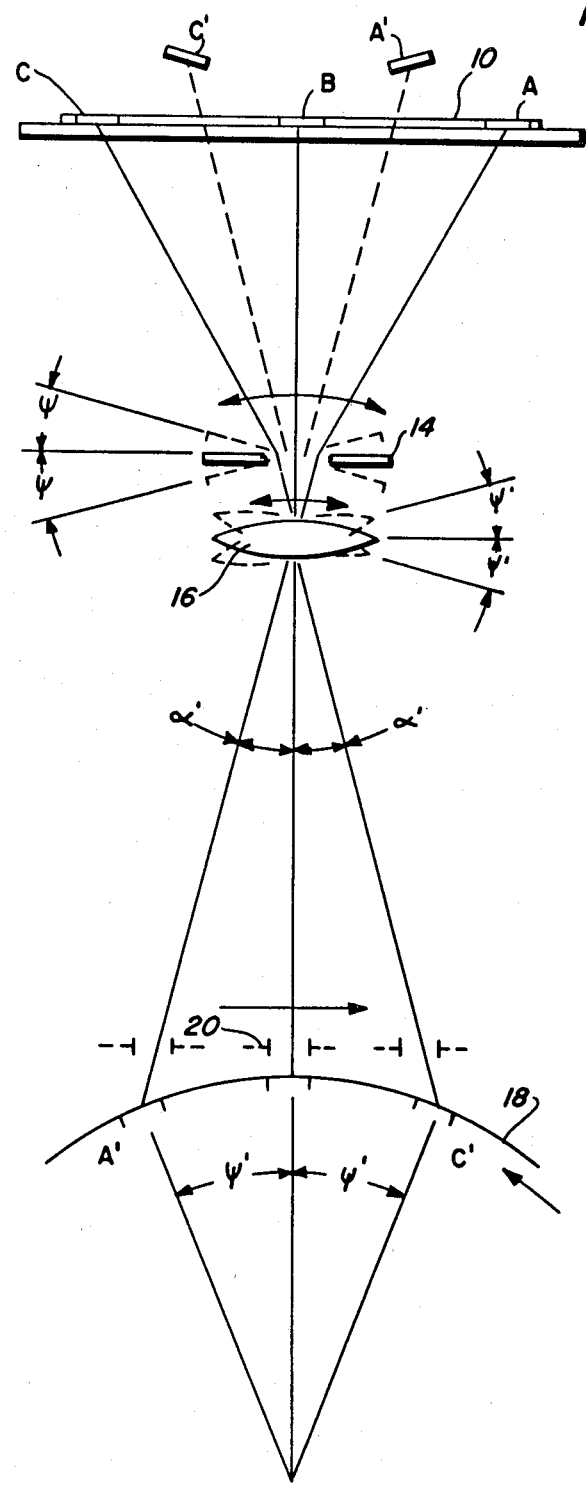
FIG. 1 is a simplified schematic of a straight through scan system illustrating the principles of the present invention.

In a pivoting mirror optical system which scans a document to be reproduced, the main requirement is to maintain an angle of incidence of the principal ray reflected from a document placed on an object plane equal to the angle of incidence of the ray at a photosensitive imaging plane while maintaining the total optical conjugate. One way of accomplishing this is to introduce a curvature of the object plane, e.g. a document platen, as is the case for example with the Xerox 2400 and 7000 machines. If a flat document platen is to be used, the virtual image of a scanned point moves out of the plane of the platen resulting in tilted imaging on the curved photoreceptor. This condition, and an optical system which compensates for it, is shown in FIGS. 1 and 2. These figures, for purpose of clarity, show an unfolded optical system and ignore, for the moment, the conjugate corrections.

Referring now to FIG. 1, a document 10 is located on platen 12. Pivoting mirror 14 rotates through some angle as to scan the document from segments A through B, C. During the scan cycle the vertical images of the scanned segments are moved out of the object plane to the indicated A', C' locations, and, if lens 16 were fixed, the imaging would be out of the lens plane and tilted to it by some angle. Ignoring for a moment the change in object to lens conjugate, the problem addressed in the figure is the elimination of this field tilt of the images A'', C'' at the photoreceptor drum 18. Applicant has perceived that if, during the scan cycle, the object plane, lens plane (plane perpendicular to lens axis) and image plane were maintained in a parallel relationship (while simultaneously maintaining total conjugate) field tilt would be eliminated. This has been accomplished by displacing an aperture slit 20 at some angle relative to the lens and in a direction opposite the drum movement.

Figure 2:
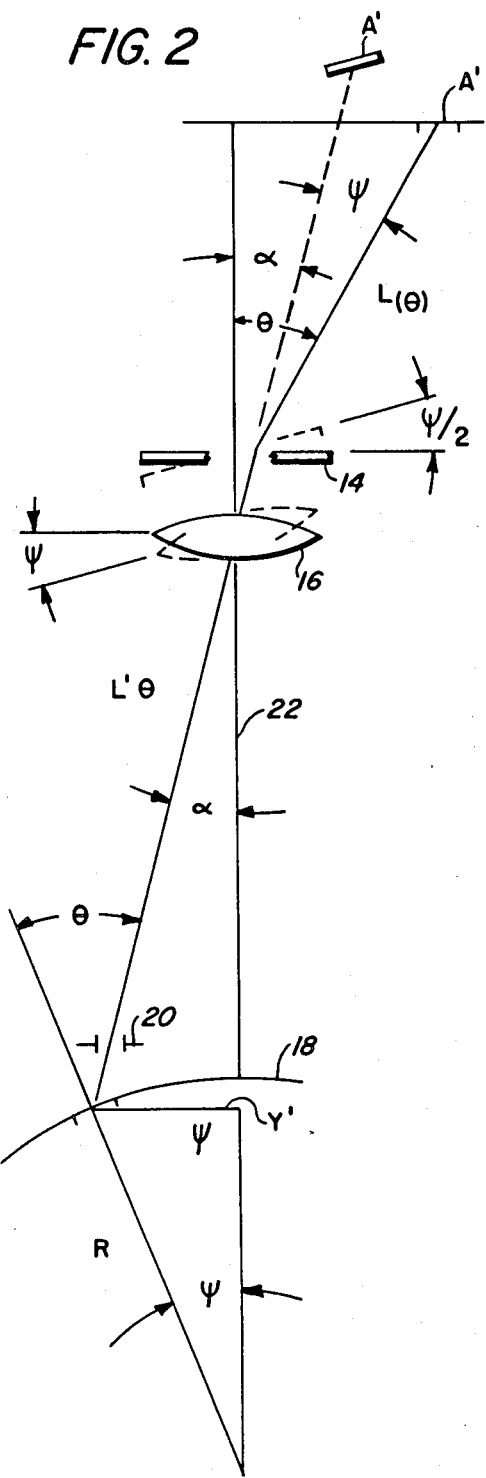
FIG. 2 shows the angular relationship of scan mirror line and imaging slit for an object segment.
Figure 3:
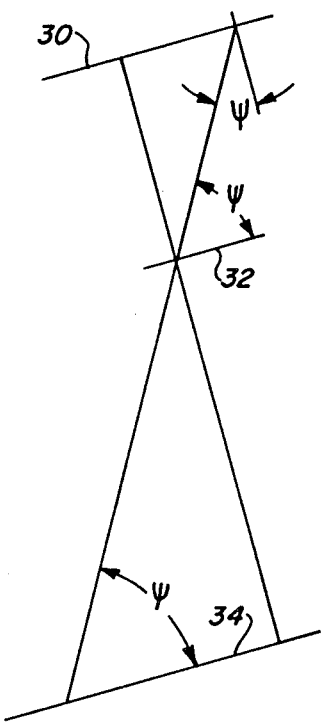
FIG. 3 illustrates the enabling field tilt free condition wherein object, line and image planes are arranged in parallel relationship during any portion of scan.

FIG. 2 shows the conditions necessary to eliminate field tilt for the imaging of scanned segment A. Referring to this figure, mirror 14 is rotated on angle $\psi/2$ causing the virtual image of area A to move to A'. The image is now out of the plane of lens 16, which is normally parallel to platen 12 and tilted to it by an angle $\psi$. Simultaneously with the movement of mirror 14, however, lens 16 is tilted by angle $\psi$ and aperture slit 20 is at a position where it forms an angle $\alpha$ relative to centerline 22. The angle $\alpha$ is selected such that an angle $\psi$ is subtended on the drum. The actual angle subtended by A' is $\theta$ ($\psi + \alpha$) and, the object plane 30, lens plane 32 and image plane 34 are parallel as shown in FIG. 3. During an entire scan operation, as shown in FIG. 1, mirror 14 rotates through an angle $\pm\psi$. Simultaneously, slit 20 moves in a direction opposite the drum rotation to cause a displacement $\pm\alpha'$ relative to lens 16 and is incidently the angle $\psi'$ at the drum. The motion of lens 16 is synchronized with that of mirror 14 and slit 20 to rotate an angle $\psi'$ to maintain parallel object and image planes. After completion of the scan cycle, the image of segment C is at C''. By advancing the slit 20 in the direction opposite the drum rotation, the projected image has been precessed along the drum surface imparting an incidental but important characteristic to this system. The time taken for drum 18 to move to the start of scan position A'' can be used to beneficially alter the rescan velocities of the scan components, ease system process speeds and reduce or eliminate interdocument gap, thereby enhancing system throughput.

Referring now to FIG. 4, there is shown an embodiment of the present invention which accomplishes a field-tilt-free scan of a document on a flat platen using the principles described above and adding additional elements to maintain total conjugate. In FIG. 4, document 10, lying on platen 12 is scanned by mirror 14. An illumination source, not shown, illuminates the underside of the platen. As in FIG. 1, lens 16 projects the scanned image through moving slit 20 onto photoreceptor drum 20. The basic operation is as described above; the rotation of lens 16 is synchronized with the rotation of mirror 14 (relative to the optical axis) and the movement of slit 20 to maintain parallel object, lens and image planes to eliminate field tilt. During the scan cycle, however, the object-to-lens distance is changing due to two factors, the object of mirror distance L changing by $L \cos \psi'$ and the rotation of the lens causes an incremental change in the angular path of the principal ray. Since lens 16, in this embodiment, has a fixed focal length, the above changes must be compensated for so as to maintain the total conjugate and keep the projected image in proper focus. This compensation is provided by adding mirror 40 which moves in the direction shown in conjunction with a displacement of mirror 14 while lens 16 is simultaneously rotating and translating along the optical axis.

While the invention has been described in the context of a preferred embodiment, other modifications are possible consistent with the spirit of the invention. For example, a zoom lens may be used in place of the fixed focal length lens. In this case, mirror 40 would not be required. Examples of zoom lenses are known in the art; e.g. as disclosed in U.S. Pat. Nos. 3,901,585, 4,056,308, and 4,076,388.

What is claimed is:

1. A scanning system for projecting light images of a stationary object along an optical path onto a curvilinear photosensitive surface comprising:
   an object plane for supporting an object to be copied;
   a projection lens having a rotational and translational motion;
   a pivoting mirror for scanning said object and reflecting said light image towards said projection lens;
   an aperture slit located adjacent the curvilinear surface, the aperture slit moving in a direction opposite the direction of movement of the curvilinear surface;
   means for maintaining constant conjugate during scan; and
   means for synchronizing the motions of said lens, mirror and aperture slit so as to maintain parallel object lens and image planes during the entire scan cycle;
   whereby said lens rotates simultaneously with said reflector and slit motion to continually maintain said projected image at the photosensitive surface at the same angle of incidence as the angle of the principal scanning ray at the object plane.

2. The scanning system of claim 1 wherein said rotatable mirror and said lens scan through an angle $\pm\psi$, and said aperture slit rotates through an angle $\pm\alpha$ relative to said lens so as to cause any angle $\pm\psi$ to be subtended at the photosensitive surface.

3. The scanning system of claim 1 further including a second translatable mirror located along the optical path between said rotatable mirror and said lens, said second mirror cooperating with a translation of said rotatable mirror to maintain total conjugate during scan.

4. The scanning system of claim 1 wherein said projection lens is a zoom-type lens.

* * * * *